United States Patent
Jun

(10) Patent No.: US 7,180,550 B2
(45) Date of Patent: Feb. 20, 2007

(54) VIDEO REPRODUCING APPARATUS AND METHOD AND APPARATUS AND METHOD FOR ADJUSTING HORIZONTAL SYNCHRONOUS SIGNAL

(75) Inventor: Sung-gon Jun, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 621 days.

(21) Appl. No.: 10/725,925

(22) Filed: Dec. 3, 2003

(65) Prior Publication Data

US 2004/0153495 A1  Aug. 5, 2004

(30) Foreign Application Priority Data

Dec. 4, 2002  (KR) .................. 10-2002-0076526

(51) Int. Cl.
*H04N 5/10* (2006.01)
*H04N 5/06* (2006.01)

(52) U.S. Cl. .................. 348/540; 348/531; 348/521

(58) Field of Classification Search .............. 348/521, 348/524, 529–531, 540, 523, 547; H04N 5/06, H04N 5/10

See application file for complete search history.

(56) References Cited

U.S. PATENT DOCUMENTS 4,891,705 A * 1/1990 Suzuki et al. .............. 348/511
5,621,485 A * 4/1997 Terao et al. ................ 348/540
5,677,743 A * 10/1997 Terao et al. ................ 348/540
5,784,121 A * 7/1998 Geerlings .................. 348/547
6,195,123 B1 * 2/2001 Meguro et al. ............. 348/190

FOREIGN PATENT DOCUMENTS

KR   10-0274223   9/2000

OTHER PUBLICATIONS

Office Action dated Oct. 28, 2004 in corresponding Korean Patent Application No. 10-2002-0076526.

* cited by examiner

*Primary Examiner*—Sherrie Hsia
(74) *Attorney, Agent, or Firm*—Staas & Halsey LLP

(57) ABSTRACT

A video signal reproducing apparatus and method for adjusting a change in a horizontal synchronous signal. The video signal reproducing apparatus transforms a format of an input video signal, generates horizontal and vertical synchronous signals, and displays the video. The video signal reproducing apparatus includes a measurer, a comparator, and an adjustor. The measurer measures a period of the horizontal synchronous signal, the comparator compares the measured period of the horizontal synchronous signal with a predetermined reference range, and the adjustor adjusts a period of a clock signal for producing the horizontal synchronous signal, if the measured period of the horizontal synchronous signal fails to fall within the predetermined reference range.

16 Claims, 4 Drawing Sheets

VIDEO REPRODUCING APPARATUS AND METHOD AND APPARATUS AND METHOD FOR ADJUSTING HORIZONTAL SYNCHRONOUS SIGNAL

CROSS-REFERENCE TO RELATED APPLICATIONS

This application claims the priority of Korean Patent Application No. 2002-76526, filed on Dec. 4, 2002, in the Korean Intellectual Property Office, the disclosure of which is incorporated herein in its entirety by reference.

BACKGROUND OF THE INVENTION

1. Field of the Invention

The present invention relates to a video signal reproducing apparatus, and more particularly, to a video signal reproducing apparatus and method, including an apparatus and method for adjusting a horizontal synchronous signal.

2. Description of the Related Art

FIG. 1 is a schematic block diagram of a conventional video signal reproducing apparatus. The conventional video signal reproducing apparatus includes an analog-to-digital converter (ADC) 100, a phase locked loop (PLL) circuit 110, a line buffer 120, a timing control logic 130, and a scaler 140.

The ADC 100 converts an input analog video signal into a digital video signal.

The PLL circuit 110 receives an input horizontal synchronous signal H_sync, and produces a video clock Video_Clock and a clock signal DCLK.

The line buffer 120 stores a display line of a digital video signal (RGB signal) in a unit of a display line. The line buffer 120 has a smaller memory capacity than a frame buffer, which can accommodate all the data displayed on a screen.

The timing control logic 130 controls writing to and reading from the line buffer 120, stores an output resolution, and outputs the video clock Video_Clock_out, a horizontal synchronous signal H_sync_out, and a vertical synchronous signal V-sync_out, for reproducing video.

The scaler 140 converts the digital video signal stored in the line buffer 120, into a video signal with a resolution suitable for reproduction and then outputs the video signal having the converted resolution.

In the video signal reproducing apparatus shown in FIG. 1, the input video signal is temporarily stored in the line buffer 120 so a calculation operation can be performed to convert the input video signal into a video signal having a resolution suitable for a display device and allow for buffering of data due to the different speeds of inputting and outputting the video signal. The input speed of the input video signal and the recording speed of the input video signal in the line buffer 120 are set by a user, but may vary according to the condition of the source used for reproducing the input video signal. However, the video signal output from the video signal reproducing apparatus has a fixed period depending on the characteristics of the display device. Thus, as writing and reading operations in the line buffer 120 are repeated, the timing of writing data to the line buffer 120 may outpace the timing of reading data from the line buffer 120.

In order to solve this problem, various control signals input to the line buffer 120 are reset right after the output vertical synchronous signal V_sync_out is generated to keep a predetermined timing between the write operation and the read operation in the line buffer 120, i.e., input and output timing periods of the video signal.

However, such a reset based on the output vertical synchronous signal may affect a period of the output horizontal synchronous signal H_sync_out. There are as many output horizontal synchronous signals as horizontal lines of a frame in a period of the output vertical synchronous signal. If resetting is performed immediately after the output vertical synchronous signal is generated, the point in time when the output horizontal synchronous signal is generated may be, at maximum, two periods slower than the point in time when the previous output horizontal synchronous signal was generated. FIG. 2 illustrates an output horizontal synchronous signal, which is delayed according to a reset signal being applied immediately after an output vertical synchronous signal is produced.

In addition, when a period of an output horizontal synchronous signal falls outside an allowed period of a horizontal synchronous signal required by the display device, an undesirable phenomenon such as bouncing, rolling, or the like may occur during display of the video signal.

SUMMARY OF THE INVENTION

The present invention provides a video signal reproducing apparatus and method, including an apparatus and method for adjusting an output horizontal synchronous signal by measuring a period of the output horizontal synchronous signal and adjusting a period of the horizontal synchronous signal to a desirable period.

Additional aspects and/or advantages of the invention will be set forth in part in the description which follows and, in part, will be obvious from the description, or may be learned by practice of the invention.

To achieve the above and/or other aspects and advantages of the present invention, there is provided a video signal reproducing apparatus, which transforms a format of an input video signal, generates horizontal and vertical synchronous signals, and displays the transformed video signal, including a measurer measuring a period of the horizontal synchronous signal, a comparator comparing the measured period of the horizontal synchronous signal with a predetermined reference range, and an adjustor adjusting a period of a clock signal, for producing the horizontal synchronous signal, if the measured period of the horizontal synchronous signal fails to fall within the predetermined reference range.

If the measured period of the horizontal synchronous signal is above the predetermined reference range, the adjustor may reduce the period of the clock signal and reproduce the horizontal synchronous signal using the reduced clock signal period. Alternatively, if the measured period of the horizontal synchronous signal is under the predetermined reference range, the adjustor may increase the period of the clock signal and reproduce the horizontal synchronous signal using the increased clock signal period.

To achieve to above and/or other aspects and advantages of the present invention, there is provided a video signal reproducing apparatus, including a converter converting an input analog video signal into a digital video signal, a line buffer storing a display line of the digital video signal, a scaler transforming a format of the digital video signal and then outputting the transformed digital video signal, a controller controlling timing of an inputting the digital video signal into the line buffer and timing of outputting the display line of the digital video signal from the line buffer to the scaler, and producing horizontal and vertical synchronous signals, and a horizontal synchronous signal detector measuring a period of the horizontal synchronous signal, adjusting a period of a clock signal for producing a new horizontal synchronous signal according to the measured period, and providing the controller with the adjusted period of the clock signal, wherein the controller produces the new horizontal synchronous signal using the adjusted clock signal.

The horizontal synchronous signal detector may include a measurer measuring the period of the horizontal synchronous signal, a comparator comparing the measured period of the horizontal synchronous signal with a predetermined reference range, and an adjustor adjusting the period of the clock signal for producing the new horizontal synchronous signal, if the measured period of the horizontal synchronous signal fails to fall within the predetermined reference range.

To achieve the above and/or other aspects or advantages of the present invention, there is provided a method of reproducing a video signal, including measuring a period of a horizontal synchronous signal, comparing the measured period with a predetermined reference range; and adjusting a period of a clock signal for producing the horizontal synchronous signal to reproduce a new horizontal synchronous signal if the measured period of the horizontal synchronous signal fails to fall within the predetermined reference range.

To achieve the above and/or other aspects or advantages of the present invention, there is provided a horizontal synchronous signal adjusting apparatus for a video signal reproducing apparatus that generates horizontal and vertical synchronous signals and displays a corresponding video signal, including a measurer measuring a period of a horizontal synchronous signal, a comparator comparing the measured period of the horizontal synchronous signal with a predetermined reference range, and an adjustor adjusting a period of a clock signal, used to generate horizontal synchronous signals by the video signal reproducing apparatus, if the measured period of the horizontal synchronous signal fails to fall within the predetermined reference range.

To achieve the above and/or other aspects or advantages of the present invention, there is provided a method of reproducing a video signal, including measuring a period of a horizontal synchronous signal, comparing the measured period with a predetermined reference range, and adjusting a period of a clock signal for producing the horizontal synchronous signal to reproduce a new horizontal synchronous signal, if the measured period of the horizontal synchronous signal fails to fall within the predetermined reference range, and to prevent a reversal of write and read timings of a display line buffer of a corresponding video reproducing apparatus.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
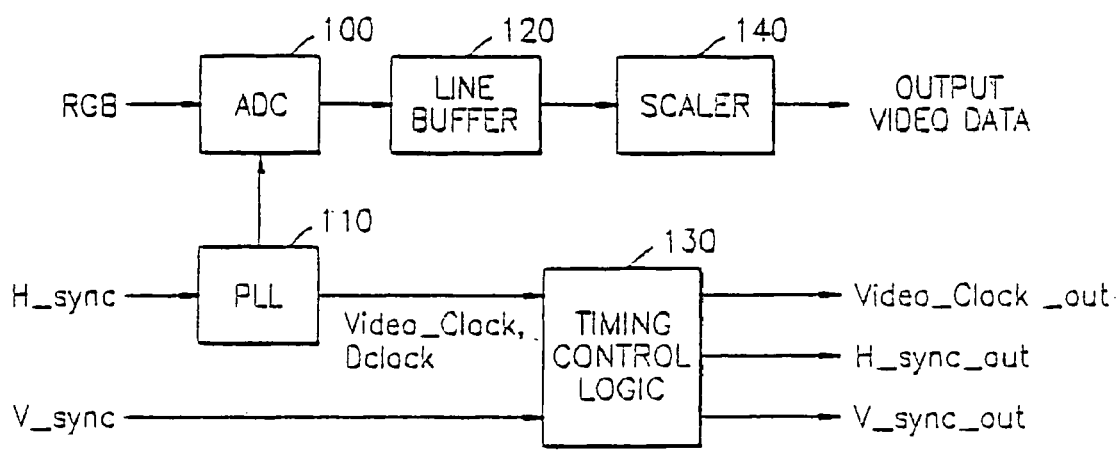
FIG. 1 is a schematic block diagram of a conventional video signal reproducing apparatus.
Figure 2:
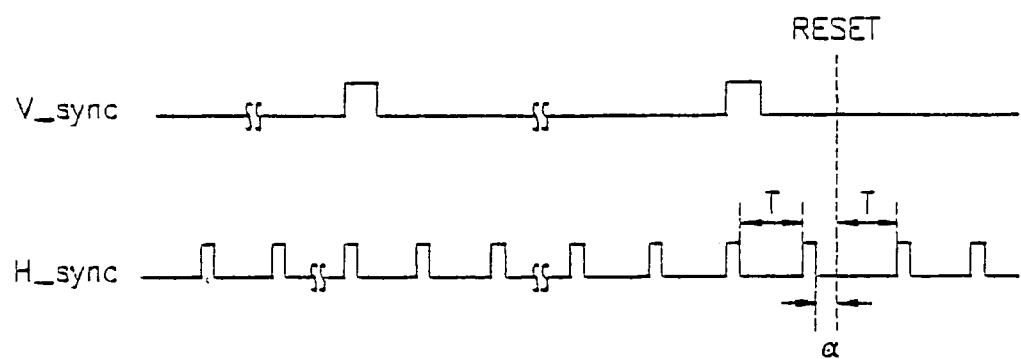
FIG. 2 illustrates an output horizontal synchronous signal delayed according to a reset signal being applied immediately after an output vertical synchronous signal is produced.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3A:
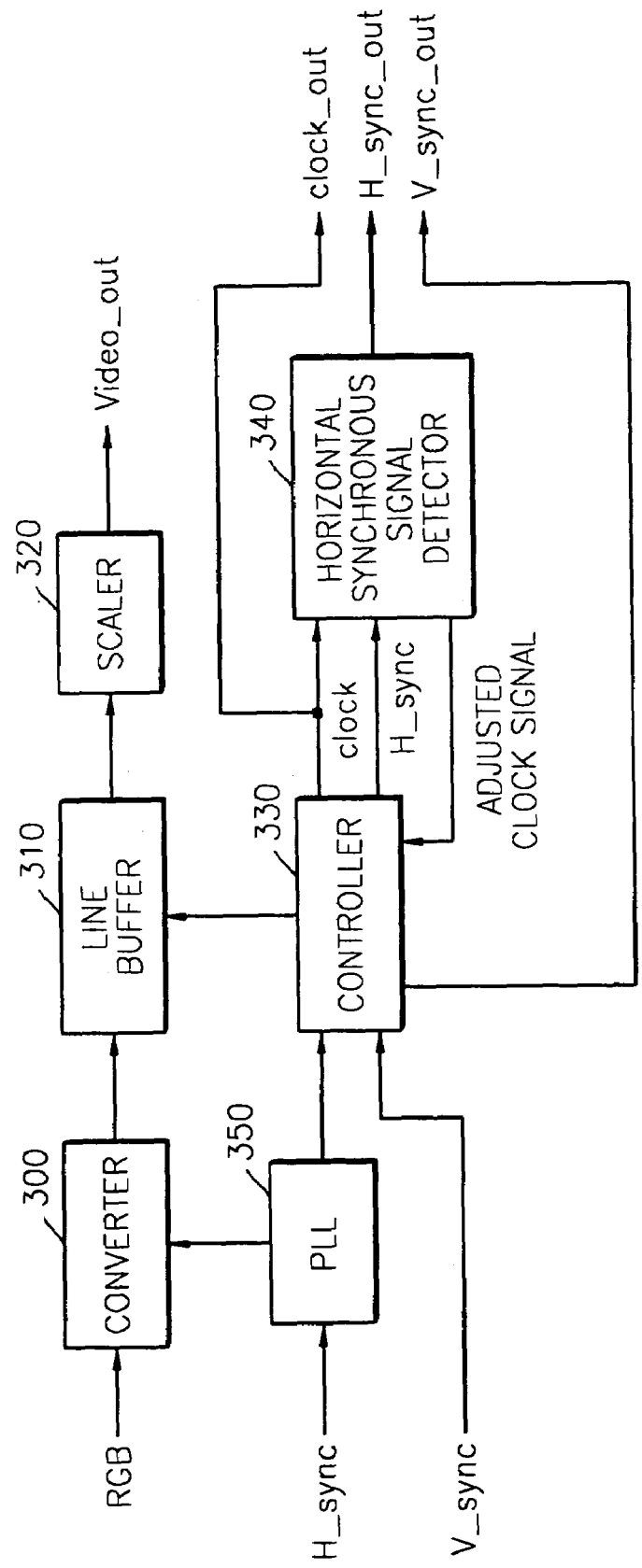
FIG. 3A is a block diagram of the video signal reproducing apparatus for adjusting a. horizontal synchronous signal, according to an embodiment of the present invention.

FIG. 3A is a block diagram of a video signal reproducing apparatus for adjusting a horizontal synchronous signal, according to an embodiment of the present invention. Referring to FIG. 3A, the video signal reproducing apparatus includes at least a converter 300, a line buffer 310, a scaler 320, a controller 330, a horizontal synchronous signal detector 340, and a PLL circuit 350.

The converter 300 converts an input analog video signal (RGB signal) into a digital video signal. The clock signal from the PLL circuit 350 is used for the converting operation.

The line buffer 310 stores the digital video signal output from the converter 300. More specifically, the line buffer 310 writes the digital video signal therein according to a write control signal and outputs the digital video signal according to a read control signal. Writing to the line buffer 310 is generally performed after data is read from the line buffer 310. However, since the read timing is fixed and the write timing is variable, it is necessary to keep a predetermined distance between the write and read timings so that the write and read timings are not reversed.

The scaler 320 transforms the format (resolution) of the digital video signal read (output) from the line buffer 310, into a format suitable for a current display device.

The controller 330 provides the line buffer 310 with the write and read control signals to control input to and output from the line buffer 310. The controller 330 generates a clock signal and produces horizontal and vertical synchronous signals suitable for the current display device using the clock signal. The controller 330 generates a reset signal immediately after producing the vertical synchronous signal to keep a predetermined distance between read and write timings of the line buffer 310. With the generation of the reset signal, the controller 330 starts counting until the horizontal synchronous signal is produced. As a result, the interval between the previous horizontal synchronous signal and the horizontal synchronous signal produced after the reset is added to the period of the horizontal synchronous signal, thereby increasing the period by +α.

The horizontal synchronous signal detector 340 measures the period of the horizontal synchronous signal output from the controller 330, and based on the measurement result, adjusts the frequency (or period) of a predetermined clock signal necessary for producing the horizontal synchronous signal. Next, the horizontal synchronous signal detector 340 provides the controller 330 with the adjusted clock signal. The controller 330 uses the adjusted clock signal to compensate for +α by moving up the point of time when the horizontal synchronous signal will be generated.

Figure 3B:
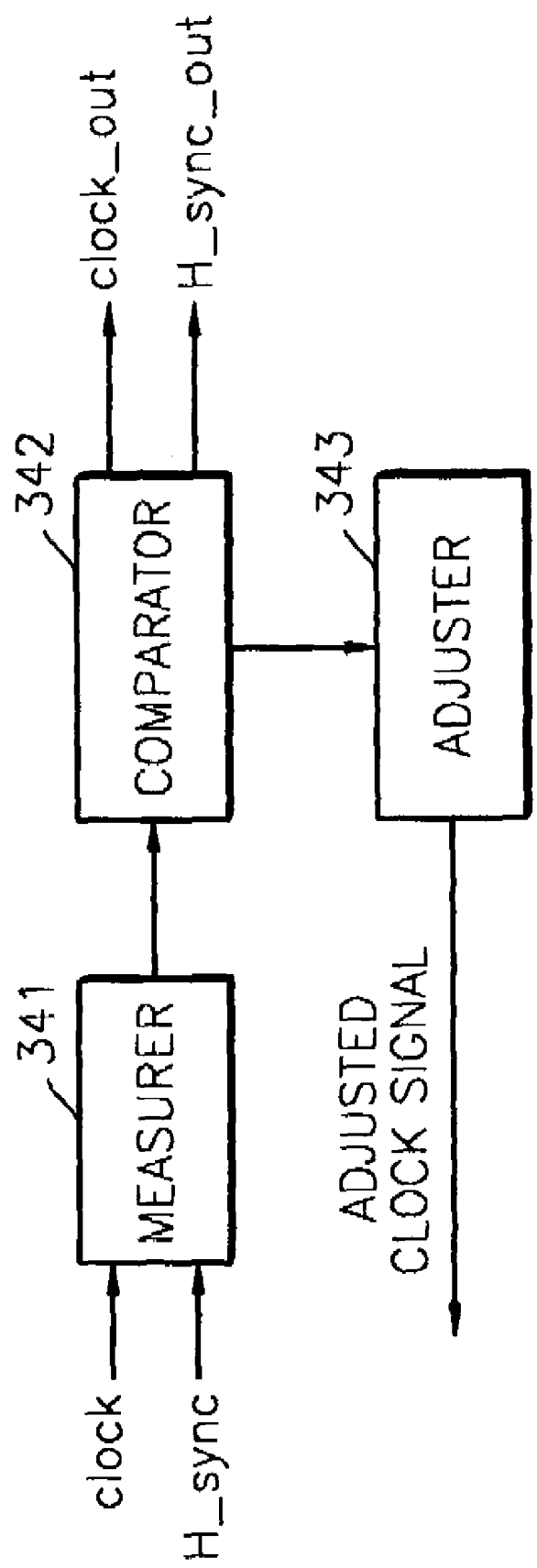
FIG. 3B is a detailed block diagram of a horizontal synchronous signal detector shown in FIG. 3A.

FIG. 3B is a block diagram of the horizontal synchronous signal detector 340. Referring to FIG. 3B, the horizontal synchronous signal detector 340 includes at least a measurer 341, a comparator 342, and an adjuster 343.

The measurer 341 measures the period of the horizontal synchronous signal output from the controller 330.

The comparator 342 compares the period of the horizontal synchronous signal, measured by the measurer 341, to a predetermined reference range and then determines whether the period of the horizontal synchronous signal falls within the predetermined reference range.

If the period of the horizontal synchronous signal does not fall within the predetermined reference range, the adjustor 343 adjusts the period of the clock signal range for producing the horizontal synchronous signal, and then provides the controller 330 with the adjusted clock signal. The controller 330 reproduces a new horizontal synchronous signal based on the adjusted clock signal. In other words, the adjustor 343 reduces the period of the clock signal when the measured period of the horizontal synchronous signal is above the predetermined reference range, and then provides the controller 330 with the clock signal having the reduced period. As a result, the controller 330 can produce and output a new horizontal synchronous signal which has a shorter period, whereby an occurrence time of the horizontal synchronous signal is moved up. In contrast, if the measured period of the horizontal synchronous signal is under the predetermined reference range, the adjustor 343 increases the period of the clock signal. When the clock signal having the increased period is provided to the controller 330, the controller 330 reproduces a new horizontal synchronous signal which has a longer period, whereby an occurrence time of the horizontal synchronous signal is delayed.

Figure 4:
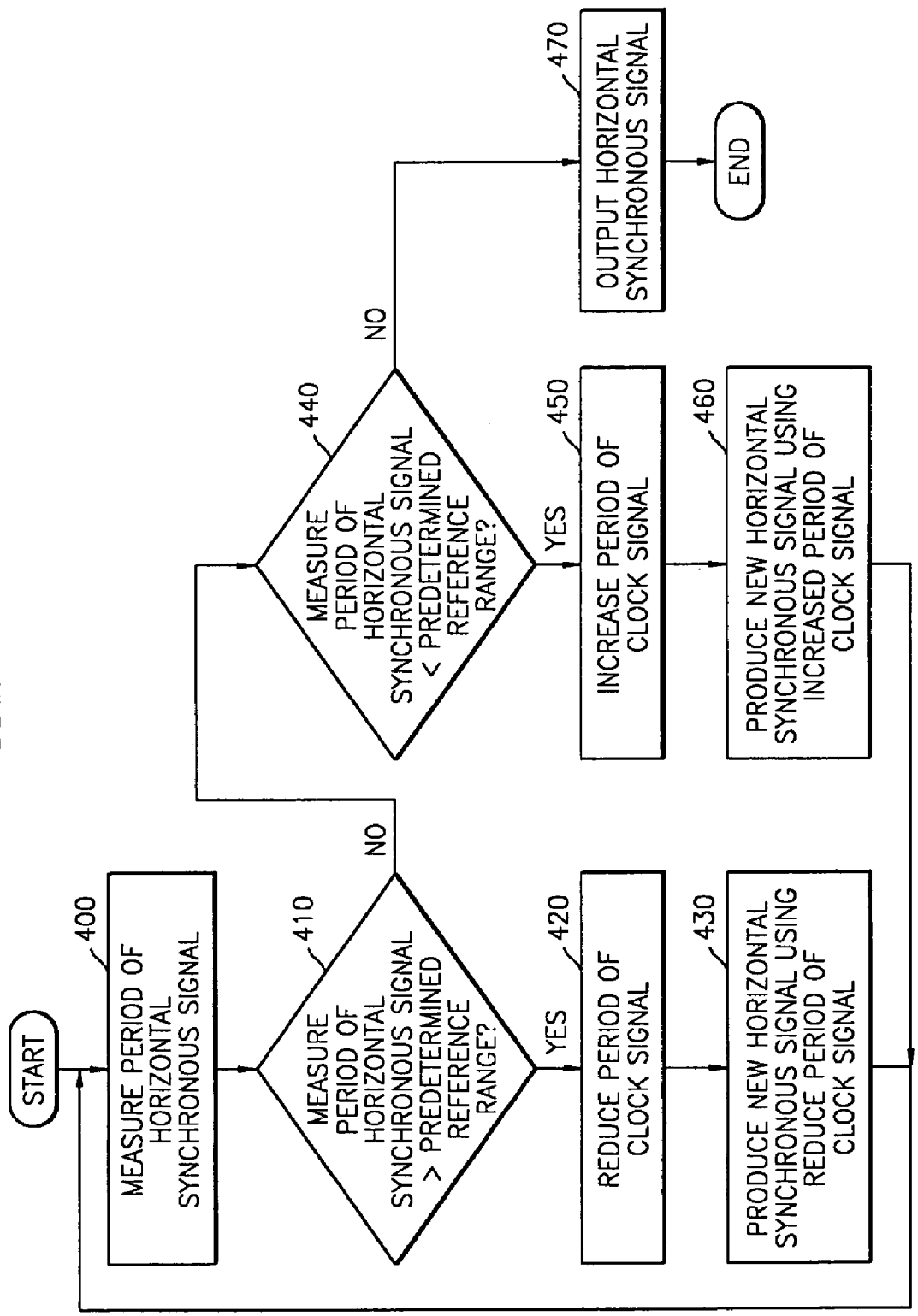
FIG. 4 is a flowchart of a method of adjusting a horizontal synchronous signal in the video signal reproducing apparatus shown in FIG. 3A, according to an embodiment of the present invention.

FIG. 4 is a flowchart of a method of adjusting a horizontal synchronous signal in the video signal reproducing apparatus shown in FIG. 3A. In operation 400, the period of the horizontal synchronous signal, output from the controller 330, is measured.

In operation 410, the measured period is compared to the predetermined reference range.

If the measured period of the horizontal synchronous signal is above the predetermined reference range, then in operation 420, the period of the clock signal for producing the horizontal synchronous signal is reduced. In operation 430, a horizontal synchronous signal having a shorter period is reproduced based on the reduced period of the clock signal.

In operation 440, if the measured period of the horizontal synchronous signal is under the predetermined reference range, then in operation 450, the period of the clock signal is increased. Subsequently, in operation 460, a horizontal synchronous signal having a longer period is reproduced based on the increased period of the clock signal.

Alternatively, if the measured period of the horizontal synchronous signal falls within the predetermined reference range the horizontal synchronous signal is output as is, without an adjustment, in operation 470.

Thus, as noted above, in order to stabilize input and output operations of a line buffer, a reset signal is generated based on a vertical synchronous signal. However, the reset signal affects the occurrence timing of a horizontal synchronous signal. Accordingly, in embodiments of the present invention, by detecting and adjusting the period of the horizontal synchronous signal to fall within a predetermined range, errors, caused by a change in the horizontal synchronous signal, and observed on the screen of a display device, can be prevented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A video signal reproducing apparatus, which transforms a format of an input video signal, generates horizontal and vertical synchronous signals, and displays the transformed video signal, comprising:
   a measurer measuring a period of the horizontal synchronous signal;
   a comparator comparing the measured period of the horizontal synchronous signal with a predetermined reference range; and
   an adjustor adjusting a period of a clock signal, for producing the horizontal synchronous signal, if the measured period of the horizontal synchronous signal fails to fall within the predetermined reference range.

2. The video signal reproducing apparatus of claim 1, wherein if the measured period of the horizontal synchronous signal is above the predetermined reference range, the adjustor reduces the period of the clock signal and reproduces the horizontal synchronous signal using the reduced clock signal period.

3. The video signal reproducing apparatus of claim 1, wherein if the measured period of the horizontal synchronous signal is under the predetermined reference range, the adjustor increases the period of the clock signal and reproduces the horizontal synchronous signal using the increased clock signal period.

4. A video signal reproducing apparatus comprising:
   a converter converting an input analog video signal into a digital video signal;
   a line buffer storing a display line of the digital video signal;
   a scaler transforming a format of the digital video signal and then outputting the transformed digital video signal;
   a controller controlling timing of inputting the digital video signal into the line buffer and timing of outputting the display line of the digital video signal from the line buffer to the scaler, and producing horizontal and vertical synchronous signals; and
   a horizontal synchronous signal detector measuring a period of the horizontal synchronous signal, adjusting a period of a clock signal for producing a new horizontal synchronous signal according to the measured period, and providing the controller with the adjusted period of the clock signal,
   wherein the controller produces the new horizontal synchronous signal using the adjusted clock signal.

5. The video signal reproducing apparatus of claim 4, wherein the controller generates a reset signal immediately after generating the vertical synchronous signal, keeps a distance from the timing of inputting to the timing of outputting the digital video signal into and from the line buffer, and starts counting until the new horizontal synchronous signal appears.

6. The video signal reproducing apparatus of claim 5, wherein the adjusting of the period of the clock signal is performed by adding or subtracting the counted interval to/from the period of the horizontal synchronous signal.

7. The video signal reproducing apparatus of claim 4, wherein the horizontal synchronous signal detector comprises:
   a measurer measuring the period of the horizontal synchronous signal;

a comparator comparing the measured period of the horizontal synchronous signal with a predetermined reference range; and an adjustor adjusting the period of the clock signal for producing the new horizontal synchronous signal, if the measured period of the horizontal synchronous signal ]does not[fails to fall within the predetermined reference range.

8. The video signal reproducing apparatus of claim 7, wherein if the measured period of the horizontal synchronous signal is above the predetermined reference range, the adjustor reduces the period of the clock signal and produces the new horizontal synchronous signal using the reduced clock signal period.

9. The video signal reproducing apparatus of claim 7, wherein if the measured period of the horizontal synchronous signal is under the predetermined reference range, the adjustor increases the period of the clock signal and produces the new horizontal synchronous signal using the increased clock signal period.

10. A method of reproducing a video signal, comprising:
measuring a period of a horizontal synchronous signal;
comparing the measured period with a predetermined reference range; and
adjusting a period of a clock signal for producing the horizontal synchronous signal to reproduce a new horizontal synchronous signal if the measured period of the horizontal synchronous signal fails to fall within the predetermined reference range.

11. The method of claim 10, wherein in the reproduction of the new horizontal synchronous signal, if the measured period of the horizontal synchronous signal is above the predetermined reference range, the period of the clock signal is reduced and the new horizontal synchronous signal is reproduced based on the reduced clock signal period.

12. The method of claim 10, wherein in the reproduction of the new horizontal synchronous signal, if the measured period of the horizontal synchronous signal is under the predetermined reference range, the period of the clock signal is increased and the horizontal synchronous signal is reproduced based on the increased clock signal period.

13. A horizontal synchronous signal adjusting apparatus for a video signal reproducing apparatus that generates horizontal and vertical synchronous signals and displays a corresponding video signal, comprising:
a measurer measuring a period of a horizontal synchronous signal;
a comparator comparing the measured period of the horizontal synchronous signal with a predetermined reference range; and
an adjustor adjusting a period of a clock signal, used to generate horizontal synchronous signals by the video signal reproducing apparatus, if the measured period of the horizontal synchronous signal fails to fall within the predetermined reference range.

14. The horizontal synchronous signal adjusting apparatus of claim 13, wherein if the measured period of the horizontal synchronous signal is above the predetermined reference range, the adjustor reduces the period of the clock signal and reproduces the horizontal synchronous signal using the reduced clock signal period.

15. The horizontal synchronous signal adjusting apparatus of claim 13, wherein if the measured period of the horizontal synchronous signal is under the predetermined reference range, the adjustor increases the period of the clock signal and reproduces the horizontal synchronous signal using the increased clock signal period.

16. A method of reproducing a video signal, comprising:
measuring a period of a horizontal synchronous signal;
comparing the measured period with a predetermined reference range; and
adjusting a period of a clock signal for producing the horizontal synchronous signal to reproduce a new horizontal synchronous signal, if the measured period of the horizontal synchronous signal fails to fall within the predetermined reference range, and to prevent a reversal of write and read timings of a display line buffer of a corresponding video reproducing apparatus.

* * * * *